United States Patent [19]

Redick

[11] Patent Number: 5,150,960
[45] Date of Patent: Sep. 29, 1992

[54] REAR LICENSE PLATE ILLUMINATION

[75] Inventor: Morris R. Redick, Waterford, Mich.

[73] Assignee: General Motors Corporation, Detroit, Mich.

[21] Appl. No.: 802,801

[22] Filed: Dec. 6, 1991

[51] Int. Cl.$^5$ ............................................. B60Q 1/56
[52] U.S. Cl. ..................................... 362/83.2; 362/31; 40/204
[58] Field of Search ............... 362/61, 83.2, 31, 26; 40/204, 205, 206

[56] References Cited

U.S. PATENT DOCUMENTS

| | | | |
|---|---|---|---|
| 3,729,626 | 4/1973 | Thurlow et al. | 362/31 |
| 4,373,282 | 2/1983 | Wragg | 362/31 |
| 4,475,298 | 10/1984 | Munoz | 40/204 |
| 4,839,776 | 6/1989 | Grossnickle | 362/31 |
| 4,903,423 | 2/1990 | Hinca | 40/205 |
| 5,008,783 | 4/1991 | Mastuoka | 362/83.2 |
| 5,029,053 | 7/1991 | Solow | 362/83.2 |
| 5,050,946 | 9/1991 | Hathaway et al. | 362/31 |

Primary Examiner—Richard R. Cole
Attorney, Agent, or Firm—William A. Schuetz

[57] ABSTRACT

A vehicle illumination device for a license plate that includes a frame enclosing a clear plastic wedge which serves as a light pipe for a light source placed along one edge of the clear plastic wedge. Upon energizing the light source, the light pipe provides an evenly distributed lighting of the vehicle plate while requiring less mounting depth than required by conventional lens lighting devices.

9 Claims, 2 Drawing Sheets

REAR LICENSE PLATE ILLUMINATION

The present invention relates to a vehicle license plate illumination device that utilizes a light pipe to provide an even distribution of light to the vehicle license plate as well as maintaining a constant spatial relationship between the vehicle license plate and the light source.

BACKGROUND OF THE INVENTION

Generally, vehicle license plate lighting at the rear of a vehicle is independent of the vehicle license plate mounting. As a result, this type of design does not provide an accurate relationship between the vehicle license plate and the lighting source since the vehicle license plate mounting typically deviates plus or minus 15 degrees from vertical. To compensate for this deviation, most present license plate lighting structures contain one or two lamps in close proximity to the vehicle license plate, and an optically treated lens is usually combined with each lamp to spread the distribution of light. Although such a structure can provide an even distribution of light, it may not be satisfactory in all cases especially if the angle of the vehicle license plate deviates significantly from the vertical. Another difficulty with present vehicle license plate illumination structures is that they must be located within a "well" in order to achieve acceptable illumination. Accordingly, such structures must typically be designed separately into each automobile design.

SUMMARY OF THE INVENTION

The present invention solves the abovementioned problems by providing a totally self-contained vehicle license plate illumination device that utilizes a light pipe. Such a device maintains a constant spatial relationship between the vehicle license plate and the light source in that the light pipe is placed in front of and covers the entire vehicle license plate. Since the present invention is self-contained and maintains a relatively narrow width in design, a "well" is not required as in conventional designs, and therefore, special automobile designs are not required. In the preferred form, the vehicle license plate illumination device, made in accordance with the present invention, includes a two-piece, wedge-shaped frame which supports the vehicle license plate in a substantially vertical position. The wedge-shaped frame also supports a light pipe made of a polished solid clear plastic wedge that contains "U"-shaped indentations along one edge of the plastic wedge. The solid clear plastic wedge is illuminated by having a light source placed inside each of the "U"-shaped indentations so that the clear plastic wedge acts as a light pipe in evenly illuminating the vehicle license plate.

The concept of illuminating a vehicle license plate is not new, as disclosed in Torii et al U.S. Pat. No. 4,406,490 and Adams U.S. Pat. No. 2,807,899. In each of these disclosures, however, a light pipe is not utilized to illuminate the vehicle license plate as in the present invention. The Adams '899 patent discloses an enclosure to protect the vehicle license plate while the Torii et al '490 patent discloses neither a light pipe nor an enclosure nor any other form of a protective cover.

To this end, the objects of the present invention are to provide a new and improved vehicle license plate illumination device incorporating a light pipe so as to provide a totally self-contained structure that can be utilized without special automobile design considerations; to provide a new and improved vehicle license plate illumination device that provides a more even distribution of light to the license plate; and to provide a new and improved vehicle license plate illumination device that requires less packaging depth than conventional designs.

DESCRIPTION OF THE PREFERRED EMBODIMENT

Figure 1:
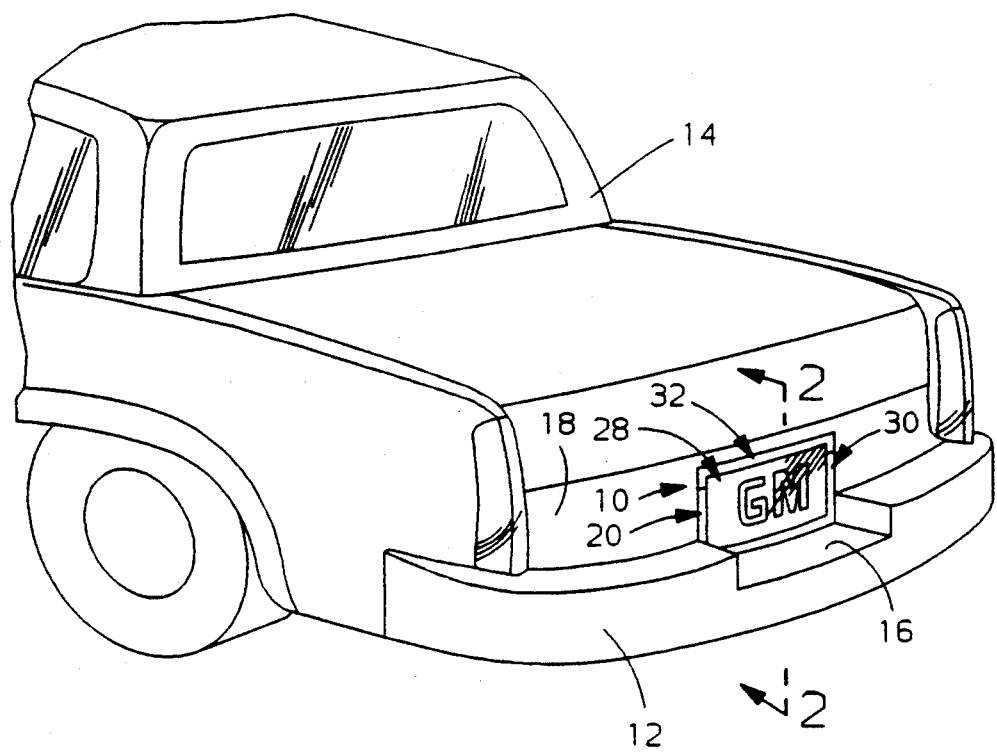
FIG. 1 is a perspective view showing the rear portion of a vehicle equipped with the vehicle license plate illumination device made according to the present invention.

Referring to the drawings, the present invention will now be described in detail with reference to the preferred embodiment.

FIG. 1 is a perspective view showing the general application of the vehicle license plate illumination device (10) made according to the present invention. The vehicle license plate illumination device (10) is shown located just above the rear bumper (12) of a vehicle (14) and within a cut-out portion (16) provided in the rear bumper (12). Although not shown, suitable mounting means are provided for connecting the vehicle license plate illumination device (10) to a rear panel (18) of the vehicle (14) and for maintaining the device (10) in a substantially vertical position.

Figure 3:
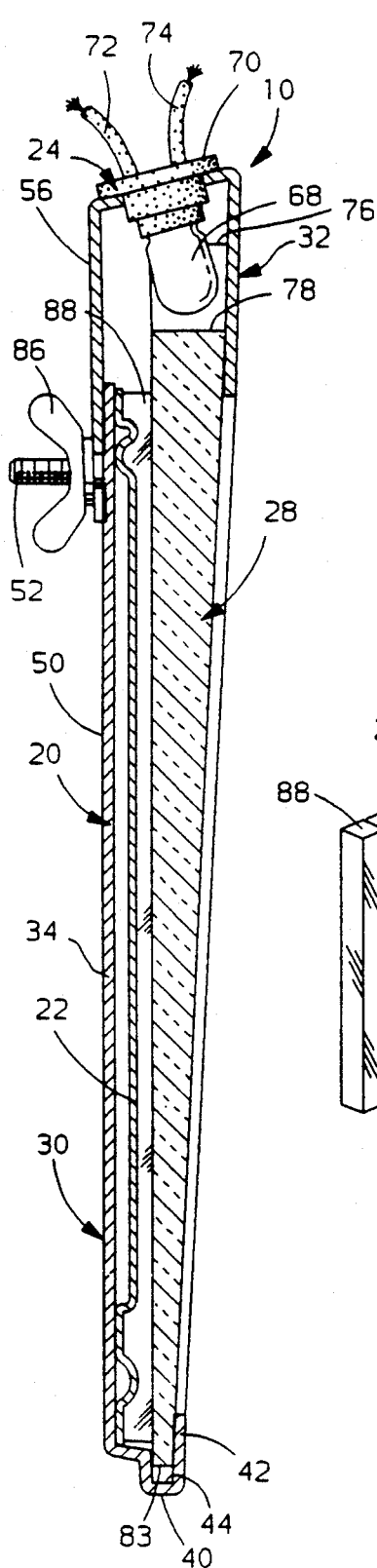
FIG. 3 is an enlarged cross-sectional view taken on line 3—3 of FIG. 2 showing a side view of the preferred embodiment of the invention.

As best seen in FIG. 3, the vehicle license plate illumination device (10) has a wedge-shaped cross section, although the assembly may take other forms and shapes. In general, the vehicle license plate illumination device (10) consists of a two-piece support frame (20), a vehicle license plate (22), a pair of identical incandescent lamp assemblies (24) and (26), and a wedge-shaped light pipe (28) made of a clear acrylic or a polycarbonate plastic.

Figure 4:
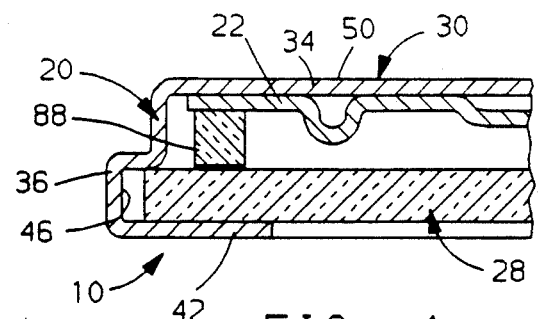
FIG. 4 is an enlarged cross-sectional view taken on line 4—4 of FIG. 2 showing a spacer that separates the vehicle license plate from the light pipe which serves to illuminate the vehicle license plate.
Figure 5:
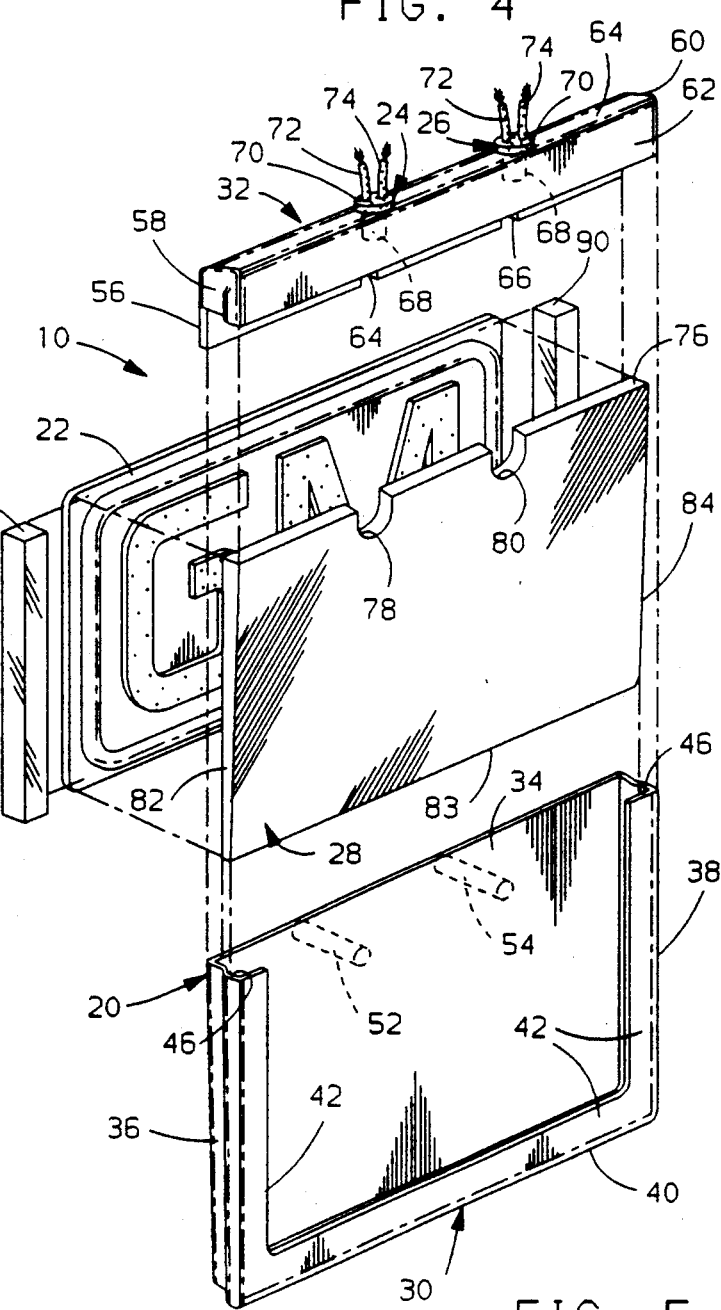
FIG. 5 is an exploded view of the present invention shown in FIGS. 1-4.

The frame (20) supports the vehicle license plate (22) and the light pipe (28) and consists of a bottom section (30) and a top section (32) which allow access to the vehicle license plate (22). As seen in FIGS. 3 and 5, the bottom section (30) of the frame (20) is "L"-shaped in cross section and includes a rear wall (34), two laterally spaced sides walls (36) and (38), a bottom wall (40) and a lip (42) integrally formed with the side walls (36) and (38) and the bottom wall (40). The lip (42) is perpendicular to the side walls (36) and (38) and the bottom wall (40) and is formed so as to provide a border which serves to support the bottom and sides of the light pipe (28). Each of the side walls (36) and (38) and the bottom wall (40) of the bottom section (30), respectively, contain a pocket (46) and (44). The pocket (44) conforms in size and configuration to and supports the bottom of the light pipe (28). Similarly, as seen in FIGS. 3 and 4, each of the pockets (44) and (46) along its longitudinal length has a width dimension that substantially conforms to the tapered shape of the light pipe (28). This arrangement of the pockets (44) and (46) in the side walls (36) and (38) and the bottom wall (40) assures that the light pipe (28) will be securely held in the position seen in FIG. 3 relative to the bottom section (30) of the frame (20).

The back surface (50) of the rear wall (34) of the bottom section (30) has two identical threaded stud members (52) and (54) that are attached thereto and extend outwardly therefrom.

The top section (32) of the frame (20) is "U"-shaped in cross section and contains a rear wall (56), two side walls (58) and (60), a front wall (62) and a top wall (64). As seen in FIGS. 4 and 5, the rear wall (56) of the top section (32) is slightly longer than the front wall (62) and contains two open-ended slots (64) and (66) which are positioned to receive the two threaded studs (52) and (54) on the back surface (50) of the rear wall (34) of the bottom section (30). The top wall (64) of the top section (32) is formed with a pair of openings for supporting the pair of lamp assemblies (24) and (26) which serve as two independent light sources. Each lamp assembly (24) and (26) includes an incandescent lamp (68) supported within a socket (70) and connected through the usual pair of wires (72) and (74) to a source of electrical power for energizing the associated lamp. The lamp assemblies (24) and (26) are supported by the top wall (64) so that each lamp (68) is located inside the frame (20) with each lamp socket (70) plugging the accommodating opening in the top wall (64) of the top section (32), and the wires (72) and (74) for each of the lamp assemblies (24) and (26) are located outside of the frame (20).

Figure 2:
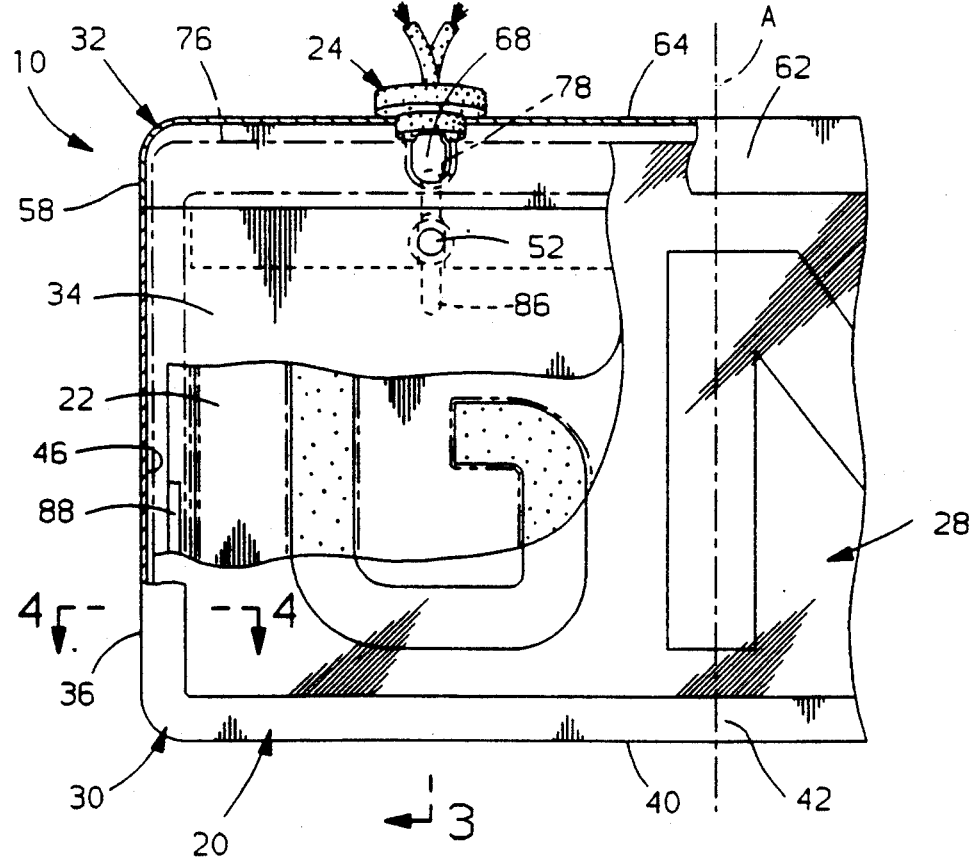
FIG. 2 is an enlarged cut-away showing the vehicle license plate illumination device in elevation.

As aforementioned, the light pipe (28) is a solid rectangular wedge-shaped block made from an acrylic or a polycarbonate plastic. The top edge (76) of the light pipe (28) contains two "U"-shaped indentations (78) and (80). The lamps (68) of the lamp assemblies (24) and (26) are located within the confines of the indentations (78) and (80) without contacting the light pipe (28) as seen in FIG. 2. The indentations (78) and (80) are spaced so as to allow the lamps (68) of the lamp assemblies (24) and (26) to provide a uniform lighting of the light pipe (28) and accordingly, of the vehicle license plate (22) when the lamps (68) are energized. This is accomplished by locating each indentation (78) and (80) midway between the vertical center line A of the light pipe (28), as seen in FIG. 2, and the side edges (82) and (84) of the light pipe.

As seen in FIG. 3, the top section (32) of the frame (20) is slightly larger in width than the upper portion of the bottom section (30), so that a portion of the top section (32) overlaps the bottom section (30) when the two sections (30) and (32) are assembled. After assembly, the two sections (30) and (32) of the frame (20) are secured to each other by having the two slots (64) and (66) in the upper section (32) receive the two threaded studs (52) and (54) of the bottom section (30), after which a wing nut (86) is threaded onto each of the two threaded studs (52) and (54) as seen in FIG. 3. The vehicle license plate (22) rests inside the frame (20) against the rear wall (34) of the bottom section (30) of the frame (20), and a pair of identical Plexiglas spacers (88) and (90), each formed as an elongated rectangular block as seen in FIGS. 3-5, are located at apposed ends of the frame (20) and in between the vehicle license plate (22) and the light pipe (28). The Plexiglas spacers (88) and (90) are designed to prevent the vehicle license plate (22) from moving or shifting relative to the light pipe (28). Such relative movement could be caused by random vibration during operation of the vehicle (14) and could cause scratching or damaging of the polished surface finish of the light pipe (28).

To replace the vehicle license plate (22), the wing nut (86) on each stud (52) and (54) is unscrewed from the threaded studs (52) and (54) of the bottom section (30), and the top section (32) is removed from the bottom section (30). The vehicle license plate (22) can then be raised out of the bottom section (30) of the frame (20), and a replacement vehicle license plate inserted in its place. The top section (32) of the frame (20) is then assembled to the bottom section (30) of the frame (20) as aforedescribed, and the two wing nuts are threaded onto the studs (52) and (54) thereby completing the assembly.

The foregoing description is of a preferred embodiment of the invention, and it will be understood by those of ordinary skill in the art that various modifications and changes may be made without departing from the scope of the invention as defined in the claims.

What is claimed is:

1. A vehicle illumination device for a license plate comprising:

a frame for supporting the license plate in a substantially vertical position wherein said frame comprises a two-piece structure and includes means permit a separation of said pieces so as to allow replacement of the vehicle plate;

a light pipe made of a solid clear material located within said frame in front of said license plate, and a light source along one edge of said light pipe whereby said light pipe serves to uniformly illuminate said vehicle license plate when said light source is energized.

2. A vehicle illumination device stated in claim 1, wherein the light source comprises a plurality of incandescent lamps placed strategically along one edge of the solid clear material.

3. A vehicle illumination device stated in claim 1, wherein the light pipe is made of a clear acrylic plastic material.

4. A vehicle illumination device for a license plate stated in claim 1, comprising:

said light pipe having a center line and opposite sides, and said light source having a pair of light sources spaced midway between said center line and said opposite sides of said light pipe.

5. A vehicle illumination device comprising:

a frame for supporting a license plate in a substantially vertical position wherein said frame comprises a two-piece structure and includes means permitting separation of said pieces so as to allow replacement of the license plate, a light pipe which is wedge-shaped in cross section and made of a solid clear material located within said frame so as to cover the entire front of said license plate, and a light source along one edge of said light pipe whereby said light pipe serves to evenly illuminate said vehicle license plate when said light source is energized.

6. A vehicle illumination device stated in claim 5, wherein the light source comprises a plurality of incandescent lamps placed strategically along one edge of the light pipe.

7. A vehicle illumination device stated in claim 5, wherein the light pipe is made of a clear acrylic plastic material.

8. A vehicle illumination device as stated in claim 5, comprising:
   said light pipe having a center line and opposite sides, and
   said light source having a pair of light sources spaced midway between said center line and said opposite sides of said light pipe.

9. A vehicle illumination device for a license plate comprising:
   a wedge-shaped frame formed with a bottom section and a top section for supporting the license plate in a substantially vertical position,
   a light pipe made of a wedge of solid clear plastic material located within said wedge-shaped frame in front of said license plate and containing two "U"-shaped indentations along one edge, the bottom section of said wedge-shaped frame having a front side and a back side and having a "L"-shaped cross section formed with a pocket and a border around the front side of said bottom section for supporting the light pipe,
   said top section of said wedge-shaped frame having a "U"-shaped cross section and being slightly larger than said bottom section so as to overlap said bottom section,
   a spacer between said light pipe and said license plate,
   a pair of lamps supported by said top section of said wedge-shaped frame and located within said indentations of said light pipe whereby said light pipe serves to evenly illuminate said vehicle license plate when said lamps are energized,
   a pair of threaded studs attached to said back side of said bottom section of said wedge-shaped frame,
   a pair of open-ended slots in said back side of said bottom section of said wedge-shaped frame, and
   means for receiving said threaded studs on said bottom section of said frame, and fastening means adapted to be threaded onto said studs to secure the top section to the bottom section for retaining the light pipe and license plate within the frame.

* * * * *